(12) United States Patent
Marcucci et al.

(10) Patent No.: US 9,253,271 B2
(45) Date of Patent: *Feb. 2, 2016

(54) SEARCHING DATA IN A SOCIAL NETWORK TO PROVIDE AN ANSWER TO AN INFORMATION REQUEST

(71) Applicant: AT&T Intellectual Property I, L.P., Atlanta, GA (US)

(72) Inventors: Justin Marcucci, Mendham, NJ (US); Coby P. Randquist, Bend, OR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,280

(22) Filed: Oct. 25, 2013

(65) Prior Publication Data

US 2014/0052789 A1 Feb. 20, 2014

Related U.S. Application Data

(63) Continuation of application No. 12/702,125, filed on Feb. 8, 2010, now Pat. No. 8,595,297.

(51) Int. Cl.
| | |
|---|---|
| G06F 15/16 | (2006.01) |
| H04L 29/08 | (2006.01) |
| G06Q 10/10 | (2012.01) |
| G06Q 30/02 | (2012.01) |
| H04L 12/58 | (2006.01) |

(52) U.S. Cl.
CPC .............. *H04L 67/22* (2013.01); *G06Q 10/10* (2013.01); *G06Q 30/02* (2013.01); *H04L 12/588* (2013.01); *H04L 51/32* (2013.01)

(58) Field of Classification Search
USPC .......................... 709/203–204, 206; 705/319
See application file for complete search history.

(56) References Cited

U.S. PATENT DOCUMENTS

| | | | |
|---|---|---|---|
| 6,643,639 B2 | 11/2003 | Biebesheimer et al. | |
| 7,080,139 B1 | 7/2006 | Briggs et al. | |
| 7,620,647 B2 | 11/2009 | Stephens et al. | |
| 7,689,624 B2 | 3/2010 | Huang et al. | |
| 7,945,565 B2 | 5/2011 | Poblete et al. | |
| 2002/0042793 A1 | 4/2002 | Choi | |
| 2002/0042794 A1 | 4/2002 | Konaka | |
| 2003/0088556 A1 | 5/2003 | Allen, III | |
| 2005/0149620 A1 | 7/2005 | Kirkland et al. | |
| 2006/0195353 A1 | 8/2006 | Goldberg et al. | |
| 2007/0162432 A1 | 7/2007 | Armstrong et al. | |
| 2007/0192300 A1 | 8/2007 | Reuther et al. | |
| 2007/0198506 A1 | 8/2007 | Attaran Rezaei et al. | |
| 2007/0219794 A1 | 9/2007 | Park et al. | |
| 2008/0133671 A1 | 6/2008 | Kalaboukis | |
| 2008/0189169 A1 | 8/2008 | Turpin et al. | |

(Continued)

OTHER PUBLICATIONS

U.S. Official Action mailed on Aug. 16, 2010 in U.S. Appl. No. 12/116,169.

(Continued)

*Primary Examiner* — Joshua Joo
(74) *Attorney, Agent, or Firm* — Hartman & Citrin LLC

(57) ABSTRACT

An information request is received from a user of a social network. Data for other users in the social network is searched in order to provide an answer to the request. A question based on the information request is sent to one or more of the other users having prior activity on the social network that is related to the information request.

18 Claims, 8 Drawing Sheets

(56) References Cited

U.S. PATENT DOCUMENTS

| | | |
|---|---|---|
| 2008/0274444 A1 | 11/2008 | Saliba |
| 2008/0294607 A1* | 11/2008 | Partovi et al. ............... 707/3 |
| 2009/0055485 A1 | 2/2009 | Tsai et al. |
| 2009/0063630 A1 | 3/2009 | Obasanjo et al. |
| 2009/0162824 A1 | 6/2009 | Heck |
| 2009/0281988 A1 | 11/2009 | Yoo |
| 2010/0076968 A1* | 3/2010 | Boyns et al. ............... 707/732 |
| 2010/0131265 A1* | 5/2010 | Liu et al. ............... 704/9 |
| 2010/0280904 A1 | 11/2010 | Ahuja |
| 2010/0318925 A1 | 12/2010 | Sethi et al. |
| 2011/0040846 A1 | 2/2011 | Weinryb et al. |

OTHER PUBLICATIONS

U.S. Official Action mailed on Feb. 10, 2011 in U.S. Appl. No. 12/116,169.
U.S. Official Action mailed on Jun. 7, 2011 in U.S. Appl. No. 12/116,169.
U.S. Official Action mailed on Dec. 7, 2011 in U.S. Appl. No. 12/116,169.
U.S. Official Action mailed on Apr. 6, 2012 in U.S. Appl. No. 12/116,169.
U.S. Official Action mailed on Sep. 6, 2012 in U.S. Appl. No. 12/116,169.
U.S. Notice of Allowance mailed on Nov. 6, 2012 in U.S. Appl. No. 12/116,169.
U.S. Appl. No. 12/116,169, filed May 6, 2008 (titled "Systems and Methods to Provide Search Based on Social Graphs and Affinity Groups", by David Yoo).
U.S. Office Action dated Jan. 19, 2012 in U.S. Appl. No. 12/702,125.
U.S. Office Action dated Jul. 17, 2012 in U.S. Appl. No. 12/702,125.
U.S. Office Action dated Dec. 12, 2012 in U.S. Appl. No. 12/702,125.
U.S. Notice of Allowance dated Mar. 29, 2013 in U.S. Appl. No. 12/702,125.
U.S. Notice of Allowance dated Jul. 15, 2013 in U.S. Appl. No. 12/702,125.
Notice of Allowance mailed Jun. 20, 2014 in U.S. Appl. No. 13/841,695.
Office Action mailed Mar. 24, 2014 in U.S. Appl. No. 13/841,695.
Huang et al., "Searching for Answers via Social Networks", Consumer Communications and Networking Conference, 2008. CCNC 2008. 5th IEEE, Jan. 10-12, 2008.
Bian et al., "Finding the Right Facts in the Crowd: Factoid Question Answering Over Social Media", World Wide Conference Committee, Apr. 21-25, 2008.

\* cited by examiner

SEARCHING DATA IN A SOCIAL NETWORK TO PROVIDE AN ANSWER TO AN INFORMATION REQUEST

CROSS-REFERENCE TO RELATED APPLICATIONS

This application is a continuation of U.S. patent application Ser. No. 12/702,125, now U.S. Pat. No. 8,595,297, entitled "Searching Data in a Social Network to Provide an Answer to an Information Request," filed Feb. 8, 2010, which is incorporated herein by reference in its entirety.

FIELD

At least some embodiments of the disclosure relate generally to the field of electronic information searches and, more particularly but not limited to, searching data of persons in a social network to provide an answer for an information request from a user.

BACKGROUND

The Internet provides a convenient way to interact and to request various types of information. People can use the Internet to communicate with each other, share information, and organize virtual communities (e.g., a social network).

A social network is typically a social structure in which a network of nodes can be used to represent a network of individuals or organizations and the connections between the nodes in the network represent the direct social connections. Web sites can be used to register the social connections of members of a social network and provide features such as automatic address book updates, viewable profiles, services to introduce members to each other to make new social connections, etc. Some social networks are organized around business connections, while other social networks are organized around common personal interests.

One way of requesting information using the Internet is by using a search tool. Some search tools allow a user to search using a search query. For example, a user may enter a location and a query for "Italian restaurants" to identify Italian restaurants in a specified area or location. Various web sites, including some social networks, are able to accept search queries from users.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
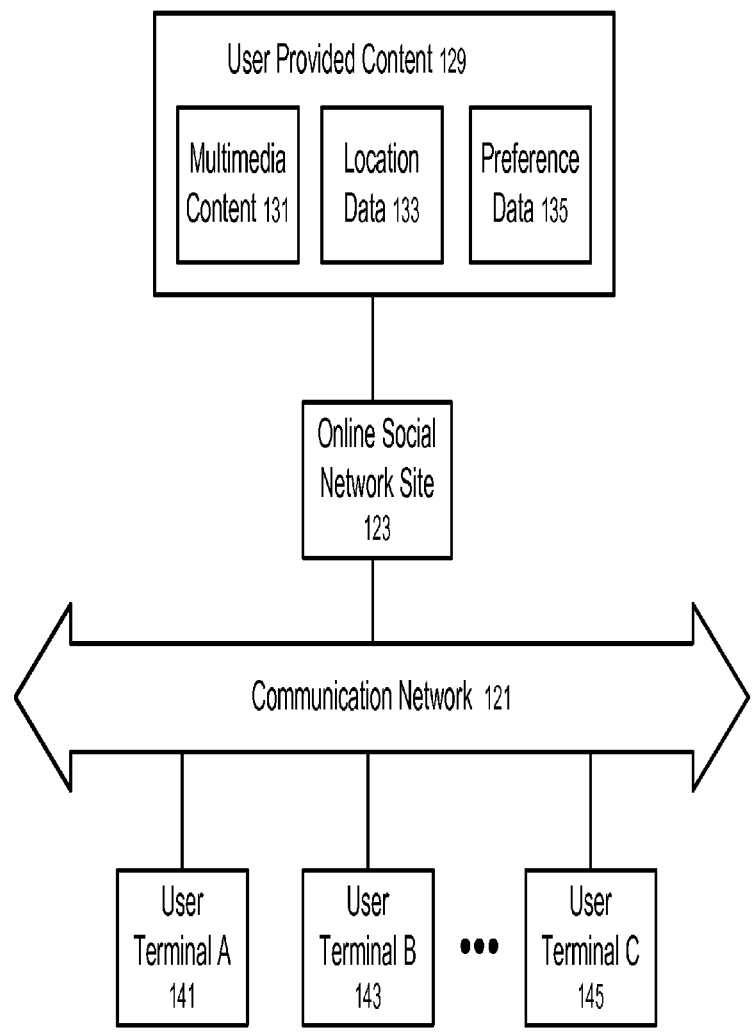
FIG. 1 shows a system including an online social network accessible by user terminals according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems and methods to search data of persons having prior activity on a social network in order to provide an answer to an information request from a user of the social network are described herein. The disclosure includes methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

In one embodiment, a method implemented in a data processing system includes receiving an information request from a user of a social network. The request includes a location. The data for a plurality of other users on the social network is searched. Each of the other users is associated (e.g., in a database on one or more storage devices) with prior activity on the network. The searching is performed to identify another user having prior activity related to a subject matter of the information request. A question is formed based on the information request, and the question is directed to the identified other user. An answer to the question is received from the other user, and the answer is provided to the user (e.g., on a web page on the social network site or in an electronic communication such as an email).

At least one embodiment of the disclosure uses information and/or user data content shared among the users of an online social network to assist in providing the answer. The use of the information shared through the social network allows the system to direct answers to other users in an automated and/or personalized way. The preferences of the users and the recommendations of their friends in the social network may be considered in directing questions to other users and/or in providing the answer.

In one embodiment, the social network includes a database that contains data representing the relations between a set of persons (i.e., a user seeking an answer and other users). In a social network, a person or member may be represented by a node; and a direct relation between two members is represented by a connection. After the direct relations between members are specified, the database can be used to determine the relations between members that are indirectly connected. For example, the member may identify a friend's friend via the service of the database.

In one embodiment, the number of connections along the shortest path in the social network between two members is considered the degree of separation between the two members. There may be more than one shortest path between the two members.

In one embodiment, the database of the social network further includes information about the members, which are considered the profile data of the members. For example, a member may edit his/her profile data via the user interface provided by the online social network. The profile data can include various information, such as the name of the member, the location of the member, the personal and/or business interests of the member, the website of the member, the education experiences of the member, etc.

In one embodiment, at least part of the profile data is public; and the public profile data is visible to other members and/or non-members. In one embodiment, the member may specify a setting to selectively classify certain information as private profile data; and the access to the private profile data is limited according to a set of rules.

In one embodiment, the user data content is shared between friends (e.g., within one degree of separation in the social network). In another embodiment, the user can specify a social distance such that the user data content is shared by users who are within the specified social distance from the user in the social network. In one embodiment, the user can specify different social distance for sharing different user data content.

FIG. 1 shows a system including an online social network accessible by user terminals according to one embodiment. In FIG. 1, the user devices or terminals (e.g., 141, 143, . . . , 145) are used to access an online social network site 123 over a communication network 121 (e.g., the Internet, a wide area network, or a local area network). The online social network site 123 may include one or more web servers (or other types of data communication servers) to communicate with the user terminals (e.g., 141, 143, . . . , 145).

The online social network site 123 is connected to a data storage facility to store user provided content 129, such as multimedia content 131, location data 133, preference data 135, etc. The multimedia content 131 may be associated with the location data 133 to provide a geographic context of the multimedia content 131. Location data 133 may be provided, for example, automatically by a GPS location device or based on other data that is sent from user terminal 141.

In FIG. 1, the users may use the terminals (e.g., 141, 143, . . . , 145) to make implicit or explicit recommendations. For example, an explicit recommendation would be a favorite provided by a user. An example of implicit recommendations would be data collected automatically by a user terminal that is related to travel by the user. Also, user selections into a user terminal (although not intended as such by the user) can be used as implicit recommendations. As another example, the user may also explicitly recommend certain locations and routes with or without additional multimedia content, such as a still picture or a video clip taken at a recommended location, a text message or a sound clip to introduce the location, etc.

In one embodiment, the user terminal (e.g., 141, 143, . . . , 145) can also be used to submit multimedia content (e.g., 131) tagged with the location data 133. For example, in one embodiment, the user terminal includes a digital still picture camera, or a digital video camera. At a transition point, the user terminal can be used to create multimedia content for sharing with friends in the online social network. In such an embodiment, the multimedia content can be tagged with the location data in an automated way.

Alternatively, the multimedia content can be created using a separate device and loaded into the online social network using the user terminal (e.g., 141, 143, . . . , 145). The users may manually tag the multimedia content with location data. For example, the user terminal can be used to associate the user data content with locations and/or routes identified by a GPS device in the user terminal.

Although FIG. 1 illustrates an example system implemented in client server architecture, embodiments of the disclosure can be implemented in various alternative architectures. For example, the online social network can be implemented via a peer to peer network of user terminals, where the multimedia content and the location data are shared via peer to peer communication connections.

For example, certain processing may be implemented in the individual user terminals, instead of running on one or more centralized servers. In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

In one embodiment, the explicit or implicit recommendations or other activity of friends in the social network are used to facilitate the automated identification of certain friends to send a question based on a user's information request.

The social network system stores and updates the information about the activity of users on the network, including user data content created and offered for sharing by the providing users (e.g., favorites or comments). The user content can be recommended by the social network system (e.g., comments) to other receiving users who have similar preferences as the provider users.

In one embodiment, the system performs matching based on user preferences and pre-defined rules. Thus, the providing users do not have to explicitly indicate the recipients of the shared information; and the receiving users do not have to annotate other people's contents for consumption. The social network system can process the preference match to provide the recommendation.

In some embodiments, the user may be presented a user interface on a user terminal, which may be used to share user data content tagged with location information. This interface may be used to submit an information request, or to provide favorites, comments, or multimedia content, (e.g., a message, a video clip, etc., for sharing with friends in the online social network). The user may specifically recommend some locations of interests via a selection on a map presented in the user interface. The user contents may, for example, be automatically associated with this location information by the user terminal using a GPS location device.

Various user preference criteria can be used to select information to be presented to a user. For example, user preference criteria may include a requirement that the provider of the information (e.g., an answer to a question) is in a preference buddy-list of the user (or within a predetermined social distance from the user). The user preference criteria may include a requirement that a person in the preference buddy-list of the user (or within a predetermined social distance from the user) has actually had prior activity of a defined type that is related to the information to be presented, or has prior activity incidents or events of more than a predetermined number of times (e.g., used a service repeatedly).

In one embodiment, the user preference criteria are configurable, pluggable, and tunable by the user. For example, the user may select a set of criteria from a set of pre-defined criteria, or add a custom designed criterion, or adjust the parameters of the selected criteria. Thus, the users can configure the matching process to obtain the desired recommendations from friends via the operation of the online social network.

Additional information regarding various data processing systems, popularity rankings, user relationship graphs, presentation of information in response to user requests, and other hardware and methods for an online social network are described in U.S. patent application Ser. No. 12/116,169, filed May 6, 2008 (titled Systems and Methods to Provide Search Based on Social Graphs and Affinity Groups, by David Yoo), which is hereby incorporated by reference herein in its entirety.

In alternative embodiments, online social network site 123 aggregates recommendations of businesses, service providers, products, information, entertainment programs, merchants, etc., and tracks the user identifications of those users making the recommendations. The network site 123 also may provide search results in response to a searching user's search query or other information request. The network site 123 selects businesses that are most relevant based on the search query and the number of recommendations of each business from users that are most closely related to the searching user. In some embodiments, the network site 123 counts only the number of recommending users of a predetermined degree of closeness to the searching user. The searching user can use the rank of the business in the search result, the number of recommending users and the identity of some or all of the recommending users to influence their decision as to which business to use. Typically, the recommendations of more closely related recommending users are more relevant to a searching user than recommendations of more distantly related or unrelated users.

In some embodiments, user terminals 141, 143, and 145 may take many forms including desktop and notebook computers, mobile phones, and personal digital assistants (PDAs). For example, the user terminals may be configured to be connected through the Internet to the social network site 123.

The online social network 123 may take various forms. Social networks include online communities where users interact and establish relationships with each other. Examples of social networks include the FACEBOOK®, MySpace® and Linkedin® web sites. (FACEBOOK, MySpace and Linkedin are registered trademarks of Facebook, Inc., Myspace, Inc. and Linkedin Corporation, respectively.) Users of online social network 123 may interact with each other in various ways including chat, email, file sharing, blogging, and affinity groups. Affinity groups may be groups that people join for any number of reasons such as to express a particular interest, engage in discussions about a particular subject or express a relationship with other members. Users of social networks establish relationships with each other in various ways on the social networks, including by joining common affinity groups, becoming "friends" or making a "connection."

A person using a user terminal may log into social network 123 to interact and establish relationships with other users. In some cases, the same person may access the social networks using different user devices at different times. For example, the person may use their desktop computer when at work, their laptop computer in a meeting, and their mobile phone when on the road. In each case, the person is identified to the social network by using a user identification to log into the social network from one of the user devices.

In some embodiments, users log into a social network or their user device using a user identification and password. In some cases, the user is somewhat anonymous in that the user identification is a user name or screen name. In other cases, the user identification may be associated with more specific identifying information, such as the user's real name or social security number. In some embodiments, a person is identified by different user names depending on which social network or user device they are accessing. In such embodiments, the network site 123 may associate a common user identification with each of the user names so that information associated with this person may be aggregated across multiple information sources.

The first person may click on an input device (e.g., a button on a web page) in a web page on the social network to indicate that the user prefers or recommends a first business. The input device is a mechanism for allowing the user to interact with the social network. For example, the input device may be a button, checkbox, or drop down list in a web page on the social network. The second person may click an input device in a web page on the social network that indicates that the user prefers or recommends the first business as well. The second person may recommend a second business instead of or in addition to the first business. Similarly, other users may indicate preferences for one or more businesses on the social network. Furthermore, these users may interact similarly with other social networks.

The context and processes for indicating these preferences and recommendations may be implemented in any of a number of ways on each of these social networks. For example, a user may browse a list of businesses from a database and click on an input device associated with a particular business to indicate a preference. In other cases, a user may review the recommended businesses of other users and click on an input device to adopt a particular recommendation as their own.

In some cases, a user may log into an account managed by the network site 123 using a user identification and make recommendations directly associated with the user profile maintained by the network site 123. For example, the user may visit the web site of a business and click on a button on their browser to add that business to their recommended businesses (e.g., favorites) as stored in their account on the network site 123. In other cases, the user logs into the social network using a user identification and makes the recommendations within the context of that social network. The network site 123 subsequently retrieves this information from the social network and associates the information with the user profile maintained by the network site 123.

In some embodiments, users of the social networks recommend businesses by clicking on an input device associated with a particular business to indicate that the user prefers or recommends that business. These recommendations and preferences may be available to other users in various ways including by viewing the recommending user's profile on the social network or receiving announcements of new recommendations through a messaging feature of the social network. The social network may employ other methods of indicating and sharing a preference or recommendation for certain businesses.

In some embodiments, users select one of several levels of favorites to indicate the strength of a recommendation. For example, user may click on one of two buttons to indicate that a particular business is either "recommended" or "highly recommended." In other cases, a multiple point scale may be used to indicate the strength of the recommendation. Other methods for users to indicate a preference for a certain business may be used. In some embodiments, these recommended businesses may be listed in the favorite list in the profile of the user on the social network or internet site.

In some embodiments, network site 123 includes one or more computers configured to perform the functionality described herein. For example, the network site 123 may include one or more computers to implement web server functionality to interface with the user terminals over the internet. Furthermore, the network site 123 may include one or more databases configured to manage information including user profiles and recommended businesses and configured to search that information in response to information requests from a user. The databases may be configured to store multiple relationships between user identifications, a list of favorite businesses of each user identification, and relationships between each user identification and an affinity group or social network.

In some embodiments, the network site 123 aggregates recommended businesses and user identifications of people that recommend each recommended business on the social networks. The network site 123 also retrieves one or more relationship graphs that indicate relationships between users of the social network 123. The relationship graphs include information about the relationships between user identifications on the social network. For example, the relationship graph may include information about which users are members of each affinity group, which users are directly related as friends or connections, and which users are more remotely connected through intermediate friends or connections, such as a friend of a friend.

In some embodiments, the user terminals may also let persons submit information requests in the form of search queries. For example, a person wanting to find someone to fix their Porsche, may submit a search query "Porsche mechanic" on the user terminal 143 using a keyboard or voice input, for example. The user terminal 143 sends the search query or other information request over the communication network 121 to the network site 123. In some cases, a location of the searching user is provided to the network site 123 so that the search service can prioritize relevant businesses based at least in part by distance from the searching user. The network site 123 provides the search results or other answer over the Internet to the user terminal 143 to the searching user.

In some embodiments, the network site 123 selects businesses in response to a search query based at least in part on the number of recommendations of each business by recommending users of a certain degree of closeness to the searching user in the one or more relationship graphs. For example, the network site 123 may select and rank businesses based at least in part on the number of recommendations from recommending users with a direct relationship with the searching user. In other cases, the network site 123 counts users with recommendations from recommending users with second degree, third degree and higher degree relationships with the searching user and ranks the businesses at least in part based on these counts.

In some embodiments, the network site 123 counts only recommendations from users in certain affinity groups or particular social networks. For example, if the searching user is searching for a financial advisor, the searching user might only be interested in the recommendations of people in a selected affinity group. In some cases, the user specifies a particular affinity group or social network to include based, for example, on their perception of the relevant expertise of members of that group or network. In other cases, the selection of groups or networks to include is done automatically based on the search query. For example, the network site 123 may only count relationships within finance related groups if the network site 123 determines that the search query is related to a finance related matter.

In some embodiments, the network site 123 transmits the search results over the communication network 121 to the user terminal 143. The user terminal 143 presents the search results with a rating or indication of one or more numbers of recommendations according to one or more criteria. In some cases, the one or more number of recommendations may include the number of recommendations overall. In some cases, one or more numbers of recommendations are presented for one or more particular categories, such as number of recommendations among each of the searching user's first degree relationships, second degree relationships, and third degree relationships. Other categories may include the number of recommending users that are a member of a particular affinity group or a member of a particular social network.

The user terminal 143 may also present the answer or search results with an indication of one or more user identifications associated with recommendations. In some cases, all the user identifications associated with the recommended business are presented. The search results may include user identifications selected or prioritized based on the recommending user's relevance to the searching user. In some embodiments, the most relevant users may be recommending users with the closest relationships to the searching user. The closest relationships are ones which the searching user may recognize and find most persuasive in influencing their selection of one of the presented businesses. In some embodiments, the relevance of recommending users may be based on one or more factors including the degree of closeness of the relationship between the two user identifications, the number of independent relationships connecting the two user identifications, the number of common group memberships, and the relevance of each affinity group to the search query.

In some embodiments, the information request or search query is submitted through an application programming interface (API) to the network site 123. For example, the API may provide for business search queries in their social network profile, provide a mechanism for the user to identify and share favorite businesses on that website and also allow the network site 123 to access that user's favorite businesses and relationships on that website.

In some embodiments, the network site 123 aggregates recommendations of all users of the website. In other embodiments, the API can be configured to specify that recommendations from a specific subset of users on the website are included. For example, the network site 123 might aggregate the recommendations of newspaper editors on the newspaper website and aggregate the recommendations of product review staff on the product review website.

In some cases, the recommendations of these users associated with the website are incorporated into the search results on the website for all searches. In other embodiments, the recommendations of these users are only incorporated into certain types of searches, such as search queries related to their area of expertise. For example, only restaurant recommendations of the restaurant critics on the newspaper website might be incorporated into the search results.

Figure 2:
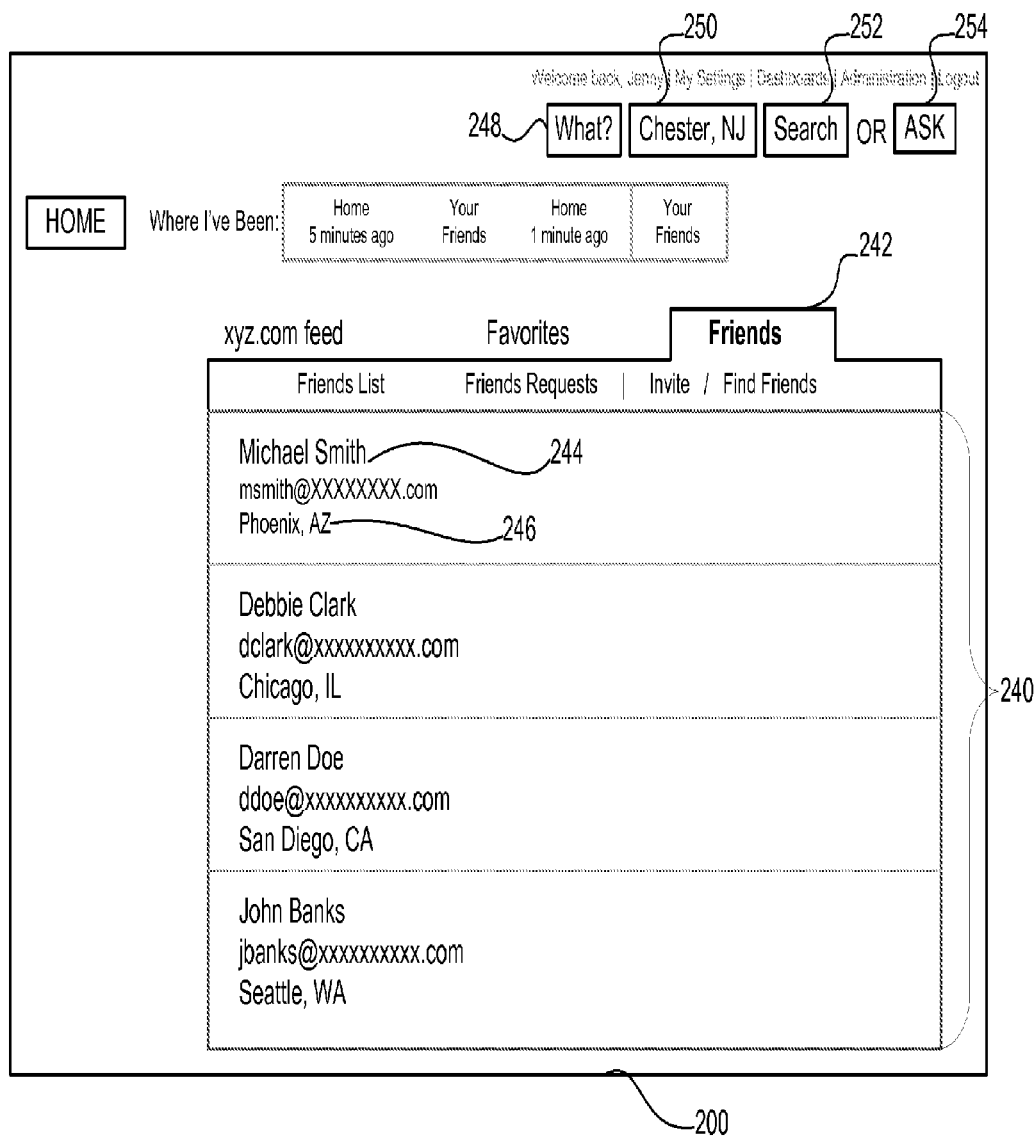
FIG. 2 shows a screen shot of a web page presenting a list of friends to a user interacting with the social network of FIG. 1 according to one embodiment.

FIG. 2 shows a screen shot of a web page 200 that presents a friends list 240 to a user interacting with social network site 123 according to one embodiment. Web page 200 is served from network site 123 to one of user terminals 141, 143, or 145.

Friends list 240 includes a listing of friends 244, etc., of the user. Each friend has an associated location 246, (e.g., as previously provided to network site 123 by the friend). The friends list is accessed by the user clicking on a "Friends" tab 242. A legend 248 has an accompanying input box 250 for the input of an information request (e.g., associated with a location) by the user seeking an answer. As an example, the user may associate the information request with a desired location by indicating the location for which the user is interested in an answer by inputting a desired location. The information request may be sent to social network site 123 by clicking, using a mouse, on "Ask" button 254.

Input box 250 may also be used for making a search query. This query may be requested using search button 252.

Figure 3:
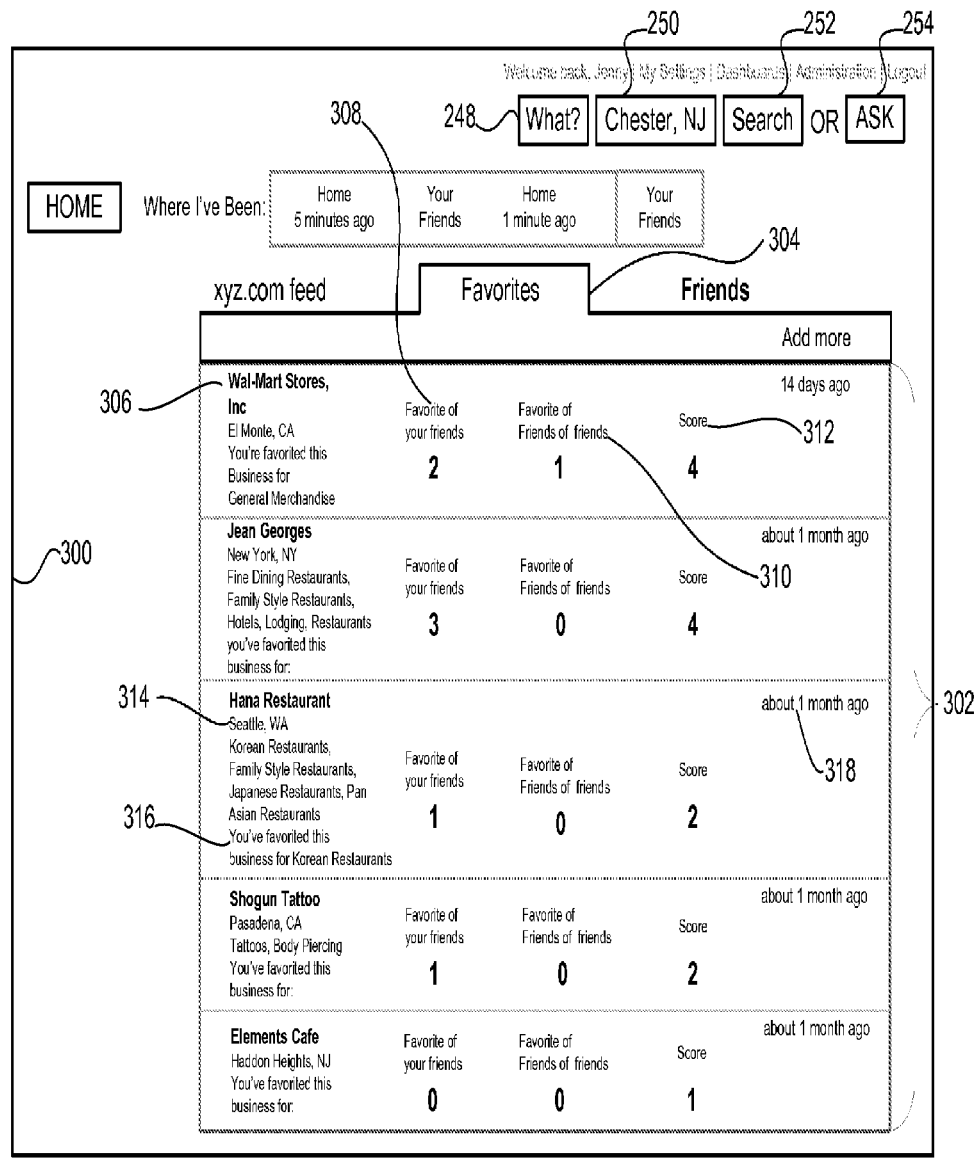
FIG. 3 shows a screen shot of a web page presenting a list of favorites to a user interacting with the social network of FIG. 1 according to one embodiment.

FIG. 3 shows a screen shot of a web page 300 that presents a favorites list 302 to a user interacting with social network site 123 according to one embodiment. Favorites list 302 is accessed by the user's clicking on a "Favorites" tab 304.

Favorites list 302 includes a list of favorites 306, etc., previously selected by the user. Each favorite is associated with a location 314. Also, each favorite may be associated with a business or service type or category 316 (e.g., General Merchandise or Korean Restaurants). These types and categories may have been previously selected by the user when the favorite was created.

Each favorite may have an associated rating 308, 310, and 312. The rating 308 is based on popularity with direct friends of the user; rating 310 is based on popularity with extended friends of the user (e.g., friends of friends); and rating 312 is based on popularity with all users of the social network. In other embodiments, the rating may be based on popularity with all users of the social network within a particular category type (e.g., as selected by the user for viewing).

The ratings may also be used for answers provided to the user, as discussed further below. Each favorite may also have a time 318 indicating the time period that has passed since, for example, the favorite was created.

Figure 4:
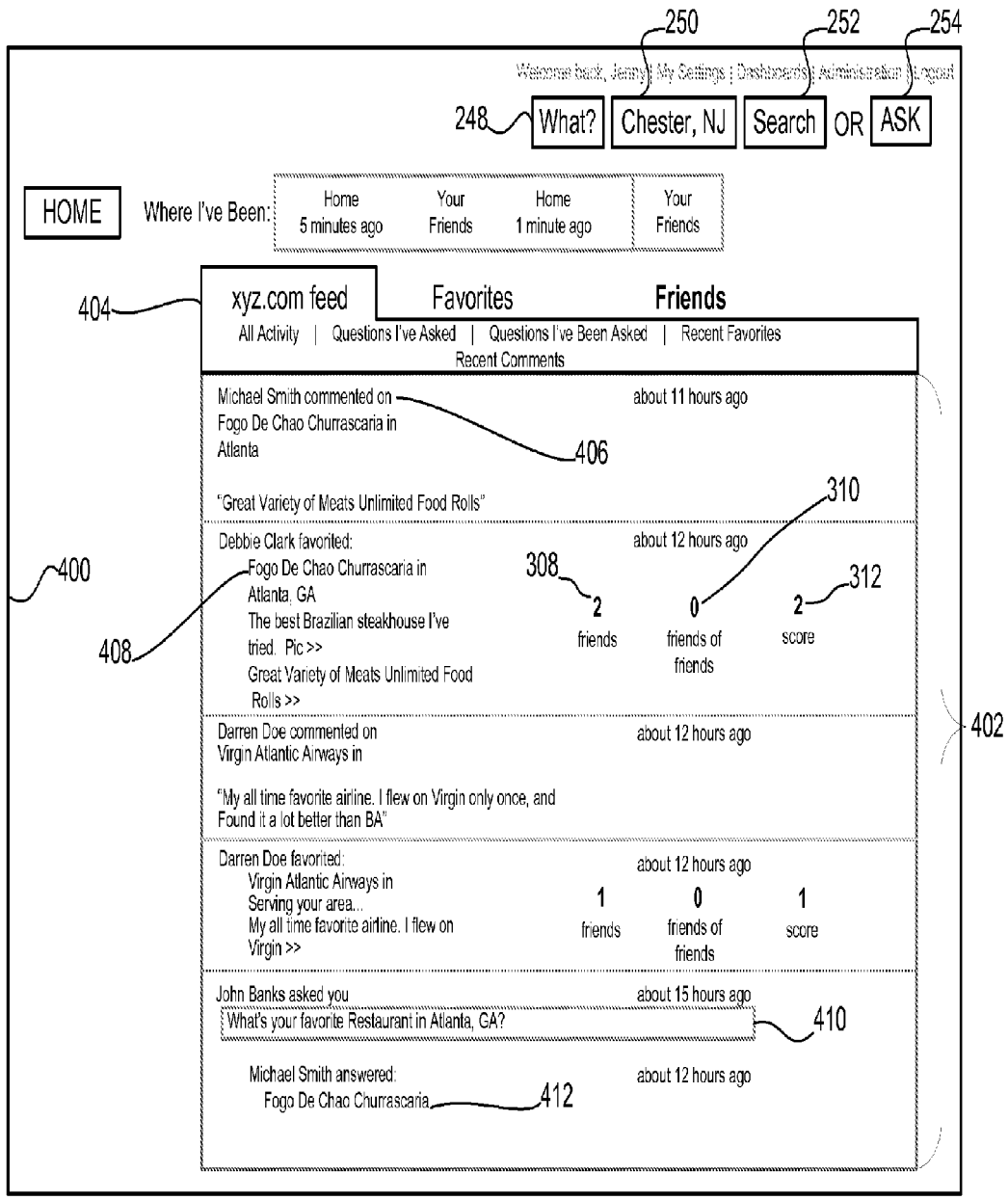
FIG. 4 shows a screen shot of a web page presenting an activity feed to a user interacting with the social network of FIG. 1 according to one embodiment.

FIG. 4 shows a screen shot of a web page 400 presenting an activity feed 402 to a user interacting with social network site 123 according to one embodiment. Activity feed 402 includes all forms of activity on the social network site that are visible to the user including, for example, comments 406 and favorites 408 created by other users, questions asked 410 (e.g., asked of the user by another user), and questions answered 412 (e.g., an answer to a question previously asked by the user). The activity feed is accessed by the user via tab 404.

Figure 5:
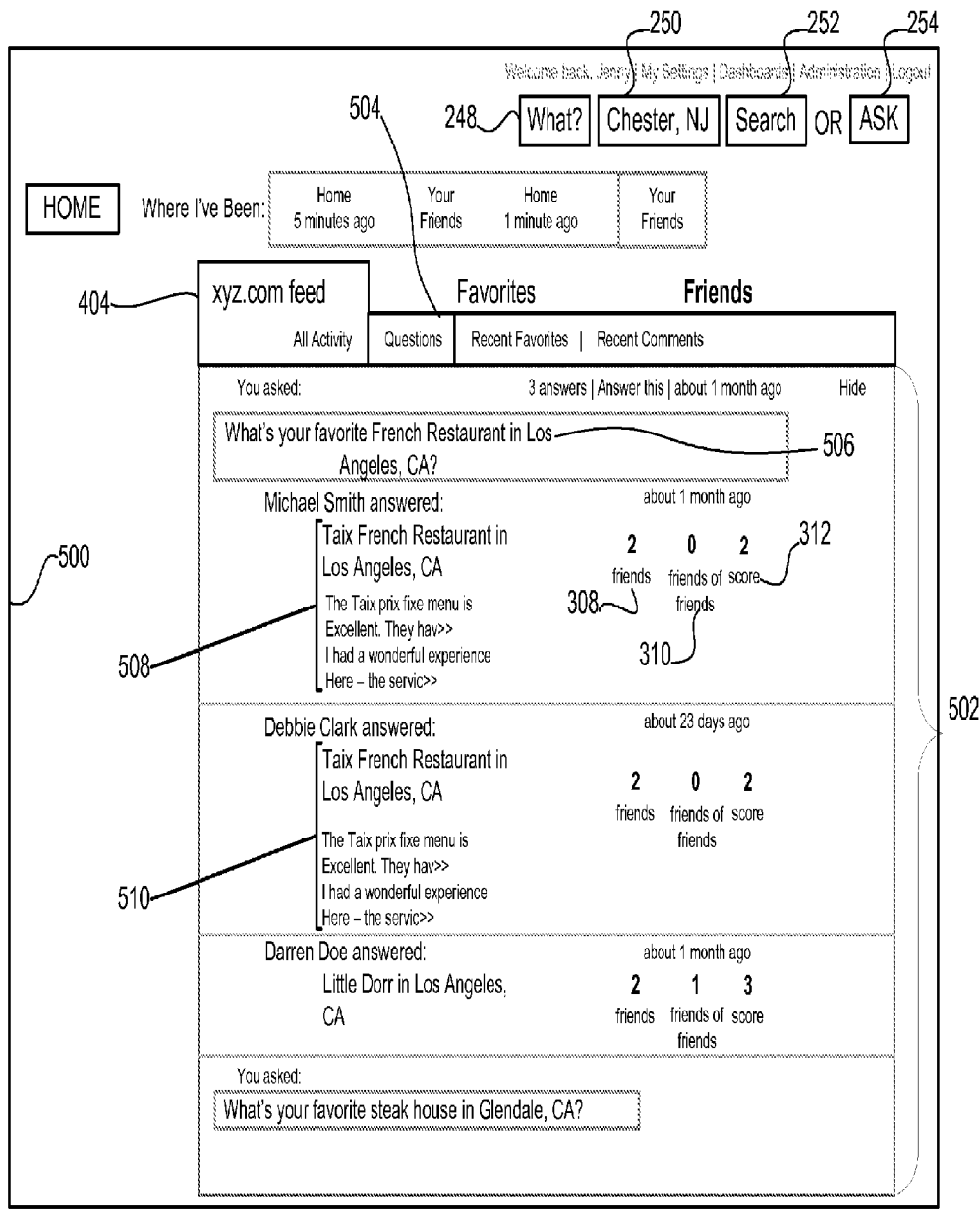
FIG. 5 shows a screen shot of a web page presenting a list of questions and answers to a user interacting with the social network of FIG. 1 according to one embodiment.

FIG. 5 shows a screen shot of a web page 500 that presents a list 502 of questions and answers to a user interacting with social network site 123 according to one embodiment. The list 502 is accessed by a user via tab 504, which is, for example, a subset of information under tab 404.

A question 506 has been asked by a user. Question 506 includes a location "Los Angeles, Calif." and requests information about a subject matter (e.g., a restaurant generally, and a French restaurant even more specifically). The user originally submitted an information request using input box 250, and initiated submission of the request to network site 123 by clicking "Ask" button 254. In response to receiving this information request, social network site 123 automatically searches its database of network data on other users in order to send a question to selected other users, as discussed herein.

Two answers 508 and 510 are received from these selected other users in reply to this question. Each answer has a rating 308, 310, and 312. Other ratings may be used. Also, the answers may be ranked in a display order based on one of these ratings. In some embodiments, the answers may be associated with a type or category, which may be displayed for the user.

Figure 6:
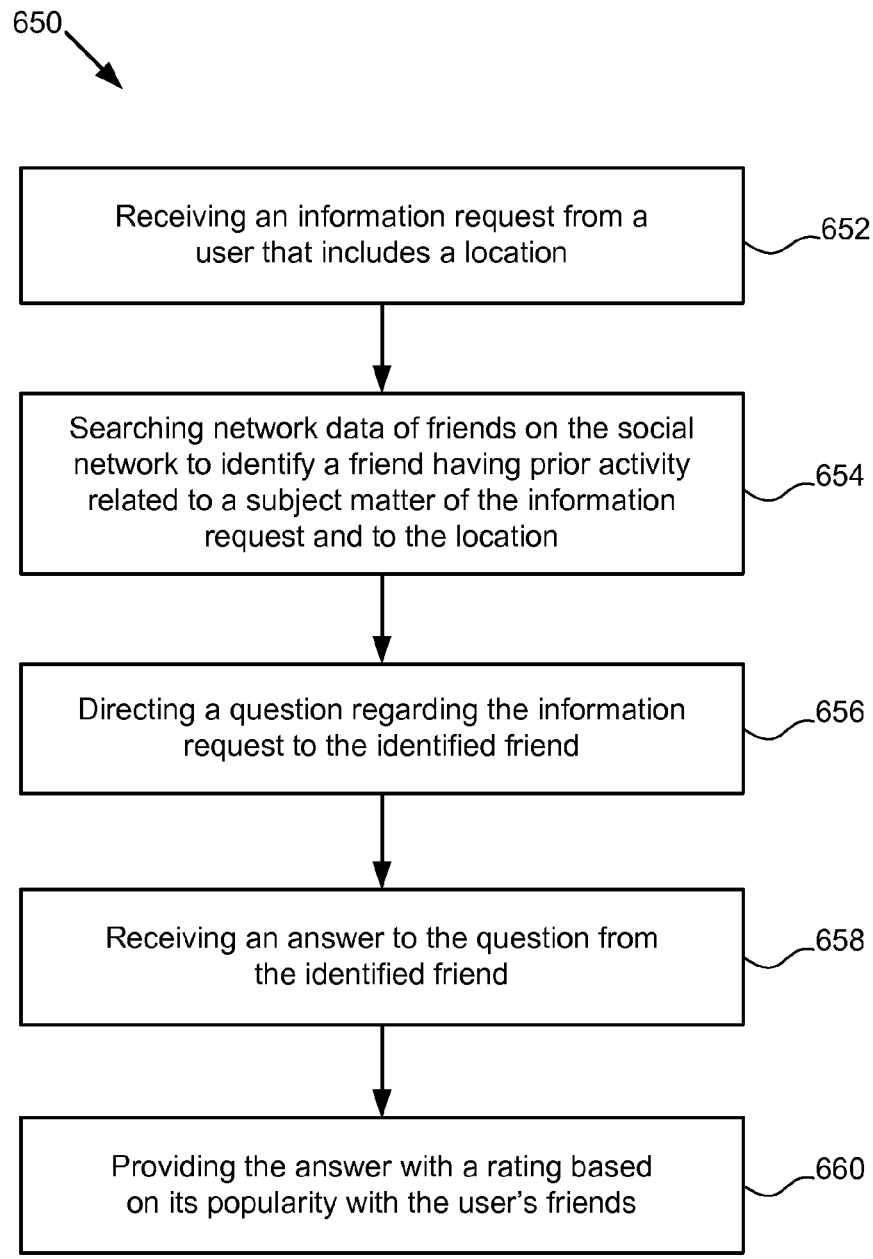
FIG. 6 illustrates a process for providing an answer in response to an information request from a user of the social network of FIG. 1 according to one embodiment.

FIG. 6 illustrates a process 650 for providing an answer in response to an information request from a user of social network site 123 according to one embodiment. In block 652, network site 123 receives an information request from a user. The information request includes a location.

In block 654, network site 123 searches network data of friends on the social network to identify a friend having prior activity related to a subject matter of the information request and to the location. In other embodiments, users other than or in addition to friends may be searched. The friends searched may be direct friends, or extended friends to any nth degree of relationship. In alternative embodiments, the search may be limited to simply a relationship to the subject matter, regardless of location. Also, in some embodiments the search may be limited to a business or service category or type that has been previously associated with the friends or other users. In alternative embodiments, the set of other users considered may be based on the relationship graph mentioned above.

For example, a relationship between the subject matter of the information request and network data that has been previously stored regarding one or more friends of the user may be determined by referencing the category and meta-data associated with all of the locations, businesses, and products for which a user has previously provided a favorite or comment.

In some embodiments, the prior activity of another user or friend is related to the location in the information request based on one or more of the following: location data previously received by social network site 123 from a user device of the other user or friend; and a favorite previously provided to the social network by the other user or friend, wherein the favorite is associated with another location that is within a predetermined distance of the location in the information request.

In other embodiments, the prior activity data includes at least one of the following: a list of favorites provided to network site 123 by the other user or friend; a comment provided to the network site 123 by the other user or friend; and data forwarded to network site 123 from a user device of the other user or friend.

In yet other embodiments, after a first friend is identified using related subject matter, network site 123 searches network data to identify a second friend having prior activity related to the location in the information request. Network site 123 directs the same question to the second friend, and receives an answer to the question from the second friend. The answer is sent to the user (e.g., displayed on a web page as discussed above), and is indicated as being a response to the information request of the user.

In block 656, network site 123 directs a question regarding the information request to the identified friend or friends (or other users). In block 658, network site 123 receives an answer to the question from the identified friend(s) or other users. In block 660, network site 123 provides the answer to the user. The answer has one or more ratings based on its popularity with the user's friends. In some embodiments, network site 123 sends an electronic notification to the identified friend(s) indicating that a question is being directed to them from the network site 123.

Figure 7:
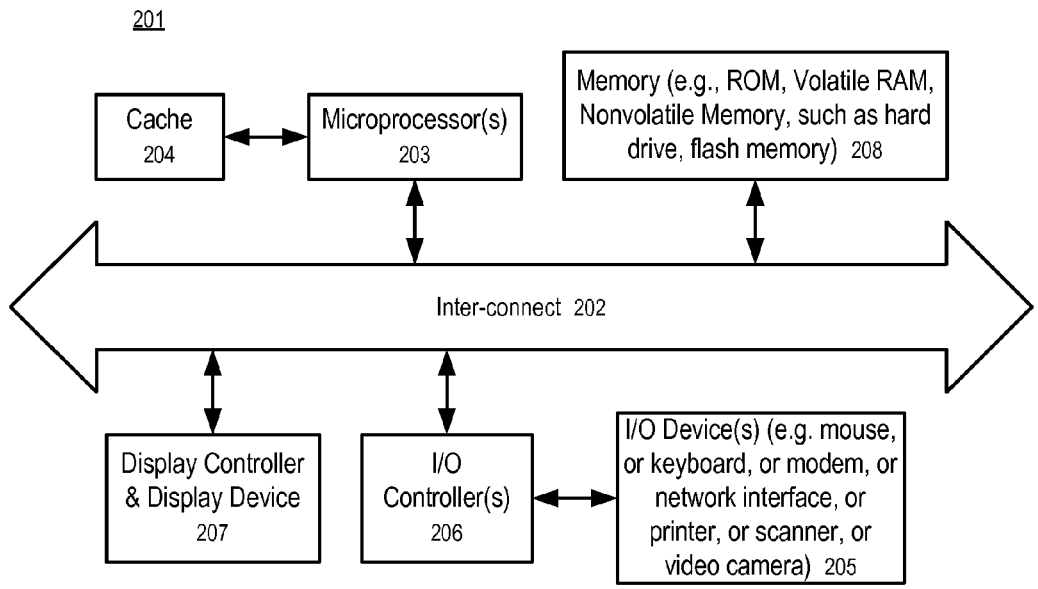
FIG. 7 shows a block diagram of a data processing system which can be used in various embodiments.

FIG. 7 shows a block diagram of a data processing system which can be used in various embodiments. While FIG. 7 illustrates various components of a computer system, it is not intended to represent any particular architecture or manner of interconnecting the components. For example, the data processing system may be used to provide online social network site 123. Other systems that have fewer or more components may also be used.

In FIG. 7, the system 201 includes an inter-connect 202 (e.g., bus and system core logic), which interconnects a microprocessor(s) 203 and memory 208. The microprocessor 203 is coupled to cache memory 204 in the example of FIG. 7.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 7 is used to implement an online social network site, a navigation engine, and/or other servers, such as a server to match user preferences and/or to select candidates for transition point.

In one embodiment, a data processing system as illustrated in FIG. 7 is used to implement a user terminal, which may receive or compute a navigation route and present the navigation route together with user data content shared via a social network. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 8:
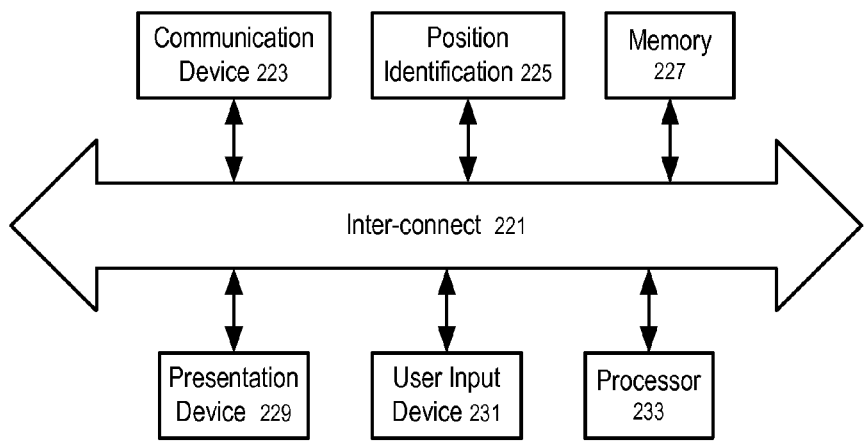
FIG. 8 shows a block diagram of a user device according to one embodiment.

FIG. 8 shows a block diagram of a user device (e.g., user terminal 141, 143, or 145) according to one embodiment. In FIG. 8, the user device includes an inter-connect 221 connecting the presentation device 229, user input device 231, a processor 233, a memory 227, a position identification unit 225 and a communication device 223.

In FIG. 8, the position identification unit 225 is used to identify a geographic location for user content created for sharing. The position identification unit 225 may include a satellite positioning system receiver, such as a Global Positioning System (GPS) receiver, to automatically identify the current position of the user device. Alternatively, an interactive map can be displayed to the user, and the user can manually select a location from the displayed map.

In FIG. 8, the communication device 223 is configured to communicate with an online social network to provide user data content tagged with location data. A location solution can be computed and presented at least in part via the processor 233 and the presentation device 229.

In one embodiment, the user input device 231 is configured to generate user data content which is to be tagged with the location information for sharing. The user input device 231 may include a text input device, a still image camera, a video camera, and/or a sound recorder, etc.

Figure 9:
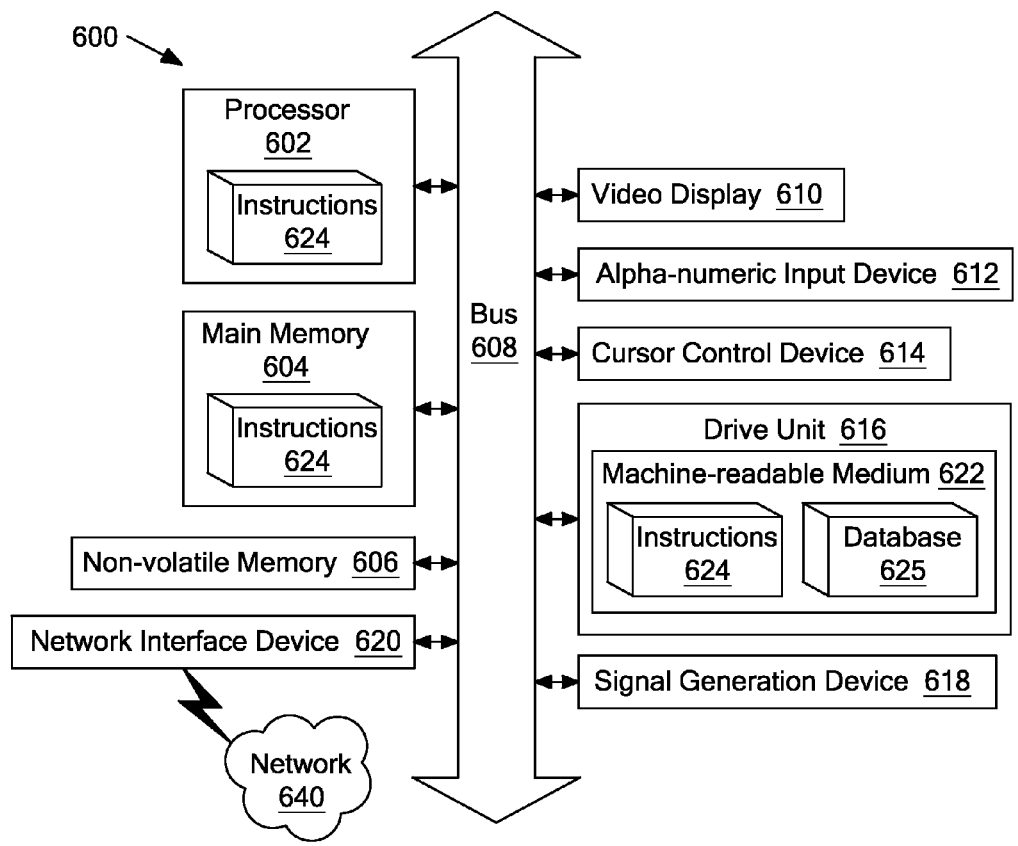
FIG. 9 is a diagrammatic representation of an alternative embodiment of a machine, within which a set of instructions for causing the machine to perform one or more of the methodologies discussed herein may be executed.

FIG. 9 is a diagrammatic representation of an alternative embodiment of a machine, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In some embodiments, the machine 600 is a user terminal 141, 143, or 145 according to an embodiment as described above. In other embodiments, the machine 600 is a portion of a social network (e.g., a machine supporting some or all of online social network site 123).

The machine 600 includes a processor 602 (e.g., a central processing unit (CPU) a graphics processing unit (GPU) or both), a main memory 604 and a nonvolatile memory 606, which communicate with each other via a bus 608. In some embodiments, the machine 600 may be a desktop computer, a laptop computer, personal digital assistant (PDA) or mobile phone, for example. In one embodiment, the machine 600 also includes a video display 610, an alphanumeric input device 612 (e.g., a keyboard), a cursor control device 614 (e.g., a mouse), a drive unit 616, a signal generation device 618 (e.g., a speaker) and a network interface device 620.

In one embodiment, the video display 610 includes a touch sensitive screen for user input. In one embodiment, the touch sensitive screen is used instead of a keyboard and mouse. The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the machine 600, the main memory 604 and the processor 602 also including machine-readable media. The instructions 624 may further be transmitted or received over a network 640 via the network interface device 620. In some embodiments, the machine-readable medium 622 also includes a database 625 including aggregated businesses, associated user identifications and user relationship graphs.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. A method comprising:
receiving, at a processor associated with a server from a first device of a first user of a social network, via a communication network, an information request relating to a subject matter and a location;
searching, by the processor, a database of social network data corresponding to a plurality of users of the social network, each of the plurality of users associated with respective prior activity on the social network;
identifying, by the processor from the database of the social network data corresponding to the plurality of users of the social network, a second user from the plurality of users, wherein the second user is identified from the plurality of users based on the second user being associated with prior activity associated with the subject matter and the location, the prior activity of the second user comprising a favorite indication provided by a second device of the second user to the social network, wherein the favorite indication provided by the second device of the second user is associated with the subject matter and another location that is within a predetermined distance of the location of the information request;
directing, by the processor, a question relating to the information request to the second user;
receiving, by the processor, a first answer to the question from the second user; and transmitting, by the processor via the communication network, the first answer to the first device of the first user.

2. The method of claim 1, wherein the plurality of users comprises social network friends of the first user of the social network.

3. The method of claim 1, further comprising:
searching, by the processor, the social network data to identify a third user having prior activity relating to the subject matter;
directing, by the processor, the question to the third user;
receiving, by the processor, a second answer to the question, the second answer being received from the third user; and
sending, by the processor, the second answer to the first user.

4. The method of claim 3, wherein the prior activity of the third user relating to the subject matter comprises a favorite indication provided by the third user to the social network.

5. The method of claim 1, wherein the subject matter of the information request relates to a business type and a business category.

6. The method of claim 1, wherein the subject matter of the information request relates to a service type and a service category.

7. The method of claim 1, wherein the prior activity of the second user further comprises information received by the social network and corresponds to activity of the second user interacting with the social network.

8. The method of claim 7, wherein the prior activity of the second user further comprises a comment associated with the second user and data provided to the social network from the second device associated with the second user.

9. The method of claim 1, further comprising providing, with the first answer, a popularity of the first answer with users of the social network.

10. The method of claim 9, further comprising displaying the first answer, wherein the first answer is ranked for display based upon the popularity of the first answer.

11. The method of claim 1, further comprising providing, with the first answer, a first popularity of the first answer with at least a portion of first degree users of the plurality of users of the social network having a first degree relationship with the first user and a second popularity of the first answer with at least a portion of second degree users of the plurality of users of the social network having a second degree relationship with the first user.

12. The method of claim 1, further comprising providing, with the first answer, a popularity of the first answer with at least a portion of affinity group users of the plurality of users of the social network, the at least a portion of affinity group users associated with a particular affinity group.

13. The method of claim 9, wherein the subject matter of the information request is associated with a business, and wherein the popularity is based upon a number of direct friends of the first user that have selected the business as a favorite on the social network.

14. A recordable medium that stores instructions that, when executed by a processor, cause the processor to perform operations comprising:
receiving, from a first device of a user of a social network, via a communication network, an information request relating to a subject matter and a location;
searching a database of social network data corresponding to a plurality of friends of the user of the social network, each of the plurality of friends being associated with respective prior activity on the social network,
identifying, from the database of the social network data corresponding to the plurality of friends of the user of the social network, a friend from the plurality of friends, wherein the friend is identified from the plurality of friends based on the friend having prior activity relating to the subject matter and the location, the prior activity relating to the friend comprising a favorite indication provided by a second device of the friend to the social network, wherein the favorite indication is associated with the subject matter and another location that is within a predetermined distance of the location of the information request;
directing a question regarding the information request to the friend;
receiving an answer to the question from the friend; and
transmitting, via the communication network, the answer and a corresponding popularity of the answer to the first device of the user, wherein the corresponding popularity is based upon a popularity of the answer with the plurality of friends.

15. The recordable medium of claim 14, wherein the prior activity relating to the friend further comprises location data received by the social network from the second device of the friend.

16. The recordable medium of claim 14, wherein the prior activity relating to the friend comprises information received by the social network, the information corresponding to activity of the friend interacting with the social network.

17. A system comprising:
a processor;
a network interface; and
a memory that stores instructions that, when executed by the processor, cause the processor to perform operations comprising
receiving, via the network interface from a first device of a user of a social network, via a communication network, an information request associated with a subject matter and a location,
searching a database of social network data corresponding to a plurality of friends of the user of the social network, each of the plurality of friends being associated with respective prior activity on the social network,
identifying, from the database of the social network data corresponding to the plurality of friends of the user of the social network, a friend from the plurality of friends, wherein the friend is identified from the plurality of friends based on the friend being associated with prior activity relating to the subject matter and the location, the prior activity comprising a favorite indication provided by a second device of the friend to the social network, wherein the favorite indication is associated with the subject matter and another location that is within a predetermined distance of the location of the information request,
directing a question relating to the information request to the friend,
receiving an answer to the question from the friend, and
transmitting, via the communication network, the answer and a corresponding popularity to the first device of the user.

18. The system of claim 17, wherein the corresponding popularity is based upon a popularity of the answer with the plurality of friends of the user.

* * * * *